3,842,034
Patented Oct. 15, 1974

3,842,034
RUBBER COMPOSITIONS
Makoto Fujimori, Hiroshi Yoshii, Noboru Kusakabe, Muneo Matsubara, Masaru Ito, and Yutaka Baba, Tokyo, Japan, assignors to Bridgestone Tire Company Limited, Tokyo, Japan
No Drawing. Filed Mar. 12, 1973, Ser. No. 340,603
Claims priority, application Japan, Mar. 24, 1972, 47/28,899
Int. Cl. C08c 11/52
U.S. Cl. 260—45.8 N      7 Claims

ABSTRACT OF THE DISCLOSURE

A heat ageing property and a dynamic ageing property of a rubber composition are improved by compounding a nitroso-quinoline compound as an antioxidant to a rubber.

---

The present invention relates to improved rubber compositions and particularly rubber compositions having improved heat ageing resistance and dynamic ageing resistance, in which a nitroso-quinoline compound is added as an antioxidant.

As an antioxidant for rubber, it has been known that a phenol or amine is compounded. Furthermore, British Patent No. 1,185,896 has proposed reactive antioxidants, for example nitroso-phenols or nitros-anilines, by utilizing a reactivity of nitroso group with unsaturated double bond in rubber molecule.

However, these antioxidants can prevent heat ageing due to oxidation or heat but cannot prevent dynamic ageing due to a severe dynamic stimulation in the rubbery articles to be used for dynamic application, such as tire and belt.

The object of the present invention is to provide improved rubber compositions by adding a specific nitroso-quinoline compound to natural or synthetic rubber as an antioxidant to prevent both the heat ageing and the dynamic ageing.

Namely, nitroso-quinoline compounds to be used in the present invention have the following general formula

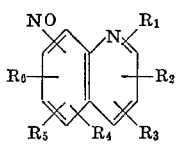

wherein $R_1$, $R_2$, $R_3$, $R_4$, $R_5$ and $R_6$ are the same or different substituents selected from the group consisting of hydrogen atom, hydroxyl group, alkyl group, aralkyl group, cycloalkyl group and aminoalkyl group having up to 15 carbon atoms.

Among them, the preferable compounds are nitroso-hydroquinoline compounds and particularly have the following formula

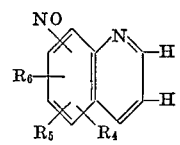

for example, alkylnitroso-hydroquinolines, such as 7-nitroso-8-hydroxy-5-methylquinoline, 5-nitroso-8-hydroxy-6-methylquinoline, 8-nitroso-5-hydroxy-6-methylquinoline, 5-nitroso-8-hydroxy-7-methylquinoline, 6-nitroso-5-hydroxy-8-methylquinoline, 8-nitroso-5-hydroxy-6-hexylquinoline, etc.; aralkylnitroso-hydroxyquinolines, such as 5 - nitroso-7-(2-hydroxy-3,5-dimethylbenzyl)-8-hydroxyquinoline, 5 - nitroso-7-(7-methylene-8-hydroxyquinolyl)-8 - hydroxyquinoline, etc.; aminoalkylnitroso-quinolines, such as 5-nitroso-7-(dibutylaminomethylene)-8-hydroxyquinoline, 5-nitroso-7-(4-morpholylmethylene)-8-hydroxyquinoline, etc. and 5-nitroso-8-hydroxyquinoline and 5-nitroso-2,8-dihydroxyquinoline and the like. Among them, the preferred compounds are 5-nitroso-8-hydroxyquinoline and the substituted derivatives thereof and particularly the derivatives substituted with aminoalkyl group having up to 5 carbon atoms.

Quinoline compounds having no nitroso group or nitroso-aromatic compounds having no quinoline nucleus have no activity of the present invention.

The nitros-quinoline compounds to be used in the present invention are added in an amount of 0.2-10 parts by weight, preferably 0.5-5 parts by weight based on 100 parts by weight of rubber.

As the addition amount is increased, the activity of the present invention is increased but when the amount exceeds 10 parts by weight, the viscosity of the composition is increased and consequently the rubber composition sticks to Bunbury's mixer and the workability is lowered.

The rubber suitable for the present invention are natural rubbers and synthetic rubbers having unsaturated double bonds in the molecule and include the mixtures mainly consisting of these rubbers.

Synthetic rubbers are, for example synthetic polyisoprene rubber, polybutadiene rubber, styrenebutadiene rubber, acrylonitrile-butadiene rubber, polychloroprene, rubbe, ethylene-propylene terpolymer, butyl rubber and the like.

When the above described nitroso-quinoline compound is to be added to and reacted with the rubber, a heat treatment is made while being mixed in Bunbury's mixer or an open roll in a usual manner and when the kneading is effected at an elevated temperature, the treatment can be effected in a short time.

The above described kneading under heating may be effected before adding usual compounding ingredients for rubber, such as inorganic fillers of carbon black, silica, calcium carbonate, but when the nitroso-quinoline compound is added together with these compounding ingredients, the internal heat generation of the mixture is high, so that such a treatment is very advantageous. In general, the above described reaction is preferred to be effected at a range of 50° C.–250° C., more preferably 100° C.–200° C.

This reaction is usually effected in the absence of a vulcanizer but when it is necessary to knead the compounding ingredients at a low temperature, it is possible to effect the reaction in the vulcanizing step.

As mentioned above, according to the present invention a nitroso-quinoline compound is added to natural rubber or a synthetic rubber to form an improved rubber composition in which the heat ageing and the dynamic ageing can be prevented. In the rubber composition according to the present invention, the resiliency also is improved and when said composition is used for a tire tread, a chipping of tread (an abnormal phenomenon in which a tire tread is torn off in scale-form) can be prevented.

The following examples are given for the purpose of illustration of this invention and are not intended as limitations thereof.

In the following Table 1, the compounds to be used in Examples and Comparative tests and the chemical structures are shown.

| Symbol | Formula | Chemical name |
| --- | --- | --- |
| A¹ | [structure] | 5-nitroso-8-hydroxy-quinoline. |
| B¹ | [structure] | 5-nitroso-6-hydroxy-quinoline. |
| C¹ | [structure] | 5-nitroso-8-hydroxy-7-methylquinoline. |
| D¹ | [structure] | 6-nitroso-5-hydroxy-8-methylquinoline. |
| E¹ | [structure] | 5-nitroso-2,8-dihydroxy-quinoline. |
| F¹ | [structure] | 8-nitroso-5-hydroxy-6-hexylquinoline. |
| G¹ | [structure] | 5-nitroso-7-(2-hydroxy-3,5-dimethylbenzyl)-8-hydroxyquinoline. |
| H¹ | [structure] | 5-nitroso-7-(7-methylene-8-hydroxy-quinolyl)-8-hydroxy-quinoline. |
| I¹ | [structure] | 5-nitroso-7-(dibutyl-aminomethylene)-8-hydroxyquinoline. |
| J¹ | [structure] | 5-nitroso-7-(4-morpholylmethylene)-8-hydroxyquinoline. |
| K² | [structure] | 8-hydroxyquinoline. |
| L² | $(CH_3)_2N$—[structure]—NO | N,N-dimethyl-p-nitroso-aniline. |
| M² | [structure]—NH—[structure]—ON | P-nitroso-diphenylamine. |

¹ Present invention.
² Comparative compound.

Examples 1–10

The heat ageing test and the dynamic ageing test were made with respect to natural rubber compositions added with nitroso-quinoline compounds (A–J in Table 1). The compounding recipe (part by weight) and the results are shown in the following Table 2. Other than the compounding ingredients as shown in Table 2, 5 parts of pine tar, 3 parts of stearic acid, 1.5 parts of paraffin wax, 2 parts of NOCRAC 810 NA (made by Ouchi Shinko Kagaku Co. phenylcyclohexyl-p-phenylenediamine, Trademark) and 5 parts of zinc white were mixed. The mixing temperature was 100° C–150° C.

TABLE 2

| | Comparative test 1 | Example 1 | 2 | 3 | 4 | 5 | 6 | 7 | 8 | 9 | 10 |
|---|---|---|---|---|---|---|---|---|---|---|---|
| Natural rubber | 100 | 100 | 100 | 100 | 100 | 100 | 100 | 100 | 100 | 100 | 100 |
| HAF carbon | 45 | 45 | 45 | 45 | 45 | 45 | 45 | 45 | 45 | 45 | 45 |
| Nocceler-MSA* (made by Ouchi Shinko Kagaku Co., trade mark) | 0.5 | 0.5 | 0.5 | 0.5 | 0.5 | 0.5 | 0.5 | 0.5 | 0.5 | 0.5 | 0.5 |
| Sulfur | 2.5 | 2.5 | 2.5 | 2.5 | 2.5 | 2.5 | 2.5 | 2.5 | 2.5 | 2.5 | 2.5 |
| Nitroso-quinoline: | | | | | | | | | | | |
| A | | 2 | | | | | | | | | |
| B | | | 2 | | | | | | | | |
| C | | | | 2 | | | | | | | |
| D | | | | | 2 | | | | | | |
| E | | | | | | 2 | | | | | |
| F | | | | | | | 2 | | | | |
| G | | | | | | | | 2 | | | |
| H | | | | | | | | | 2 | | |
| I | | | | | | | | | | 2 | |
| J | | | | | | | | | | | 2 |
| Heat ageing test (48 hours after ageing (100° C.)): | | | | | | | | | | | |
| Retention percentage of energy necessary for breakage of a sample after heat ageing compared to a sample prior to heat ageing (percent) | 44 | 61 | 56 | 58 | 54 | 58 | 54 | 56 | 55 | 59 | 58 |
| Variation ratio of 300% modulus (percent) | 126 | 108 | 109 | 016 | 113 | 109 | 108 | 114 | 109 | 110 | 110 |
| Dynamic ageing test (Test after ageing): Flex crack | C | A | B | A | B | B | B | A | A | A | B |

*Nocceler-MSA=N-oxydiethylene-2-benzothiazole sulfenamide.

NOTES:

Retention percentage of energy necessary for breakage of a sample after heat ageing compared to a sample prior to heat ageing = $\dfrac{\text{Energy amount necessary for breakage of a sample after heat ageing}}{\text{Energy amount necessary for breakage of a sample before heat ageing}} \times 100$ Each energy amount necessary for breakage being determined from stress-strain curve:

Variation ratio of 300% modulus = $\dfrac{\text{300\% modulus value of a sample after heat ageing}}{\text{300\% modulus value of a sample prior to heat ageing}} \times 100$ Flex crack test.—By means of De-Mattia tester British standard 903 Part 10 (Bending time: 20,000).

Estimation standard of flex crack test:
A = A small amount of crack appears on the surface.
B = A large amount of cracks appear on the surface and increase the depth in the thickness direction.
C = A few cracks converge and grow.
D = Cracks grow and expand over the whole surface.
E = Groups of cracks appear.

The retention percentage of energy as defined above of the samples according to the present invention is larger than that of the comparative test and the variation ratio of 300% modulus in the samples of the present invention can be maintained in lower value than that in the comparative test and these facts show that the rubber composition containing the nitroso-quinoline compounds is superior in the heat ageing property to the rubber composition of the comparative test. Furthermore the results of the flex crack test show that the rubber composition according to the present invention is superior in the dynamic ageing property to the rubber composition of the comparative test.

Examples 11–13

With respect to natural rubber and styrenebutadiene rubber (SBR) compounded with 5 - nitroso - 8 - hydroxyquinoline (A) and the comparative compounds (K, L and M), the heat ageing test and the dynamic ageing test were made and the obtained results are shown in the following Table 3. This Table also shows the compounding recipe.

TABLE 3

| | Comparative test 2 | Example 11 | Comparative test 3 | Comparative test 4 | Comparative test 5 | Example 12 | Comparative test 6 | Comparative test 7 | Example 13 |
|---|---|---|---|---|---|---|---|---|---|
| Natural rubber | 100 | 100 | 100 | 100 | 85 | 85 | 85 | | |
| SBR #1500 | | | | | 15 | 15 | 15 | 100 | 100 |
| ISAF carbon | 45 | 45 | 45 | 45 | 45 | 45 | 45 | | |
| Calcium carbonate | | | | | | | | 60 | 60 |
| Nocceler-MSA (made by Ouchi Shinko Kagaku Co., trademark) | 0.5 | 0.5 | 0.5 | 0.5 | 0.5 | 0.5 | 0.5 | | |
| Nocceler-D* (made by Ouchi Shinko Kagaku Co., trademark) | | | | | | | | 0.4 | 0.4 |
| Nocceler-DM** (made by Ouchi Shinko Kagaku Co., trademark) | | | | | | | | 0.7 | 0.7 |
| Sulfur | 2.5 | 2.5 | 2.5 | 2.5 | 2.5 | 2.5 | 2.5 | 2.5 | 2.5 |
| Nitroso-quinoline—A | | 2 | | | | 2 | | | 2 |
| Comparative compound: | | | | | | | | | |
| K | | | 2 | | | | | 2 | |
| L | | | | 2 | | | | | |
| M | | | | | 2 | | | | |
| Heat ageing test (48 hours after ageing (100° C.)): | | | | | | | | | |
| Retention percentage of energy necessary for breakage of a sample after heat ageing compared to a sample prior to heat ageing (percent) | 42 | 58 | 49 | 48 | 58 | 65 | 64 | 55 | 92 |
| Variation ratio of 300% modulus (percent) | 125 | 115 | 115 | | 146 | 137 | 148 | 120 | 126 |
| Dynamic ageing test: | | | | | | | | | |
| Test after ageing—Flex crack estimation | C | A | C | D | B | A | D | B | A |
| After tire running—Variation ratio of 300% modulus | 111 | 102 | 113 | 114 | 134 | 118 | 125 | | |

*Nocceler-D = Diphenylguanidine.
**Nocceler-DM = Dibenzothiazyl disulfide.
NOTE.—Flex crack test = Bending time, 15,000.

Other than the compounding ingredients as shown in Table 3, the same additives as described in Examples 1–10 were added and the test methods were followed to those in Examples 1–10. The modulus in the tire running test was estimated with respect to the following sample. A tire in which the tread was composed of each rubber composition sample, was produced and run for 10,000 km. After the running test, the tread portion was cut off from the tire and the modulus of said tread portion was determined. From the results of Table 3 it can be seen that the nitroso-quinoline compound (A) according to the present invention shows much more excellent dynamic ageing property than the comparative quinoline compound (K) having no nitroso group and the comparative nitrosoaromatic compounds (L and M) having no quinoline nucleus.

The comparison of Comparative test 7 with Example 13 shows that even if calcium carbonate is used as a filler, the heat ageing property and the dynamic ageing property when the nitroso-quinoline compound (A) is added, are improved as compared with the case where no nitroso-quinoline is added.

Examples 14–18

In these Examples, the heat ageing test and the dynamic heat ageing test were made by adding 5-nitroso-8-hydroquinoline (A) according to the present invention to various rubbers and varying the amount of 5-nitroso-8-hydroquinoline added.

The compounding recipe and the obtained results are shown in Table 4.

a nitroso-quinoline compound having the general formula

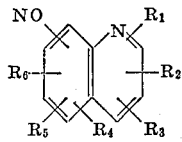

wherein $R_1$, $R_2$, $R_3$, $R_4$, $R_5$, and $R_6$ may be the same or different and are selected from the group consisting of hydrogen, hydroxyl group, alkyl, aralkyl, cycloalkyl and aminoalkyl radicals having up to 15 carbon atoms.

2. A vulcanizable composition as claimed in claim 1, wherein $R_1$, $R_2$ and $R_3$ are hydrogen and at least one of $R_4$, $R_5$ and $R_6$ is hydroxyl group.

3. A vulcanizable composition as claimed in claim 1, wherein said nitroso-quinoline compound is 5-nitroso-8-hydroxyquinoline.

4. A vulcanizable composition as claimed in claim 1, wherein said nitroso-quinoline compound is 5-nitroso-8-hydroxy-7-methylquinoline.

5. A vulcanizable composition as claimed in claim 1, wherein said nitroso-quinoline compound is 5-nitroso-7-(dibutylaminomethylene)-8-hydroxyquinoline.

6. A vulcanizable composition as claimed in claim 1, wherein the amount of said nitroso-quinoline compound is from 0.5–10 parts by weight per 100 parts by weight of rubber.

7. A vulcanizable composition as claimed in claim 1, wherein said rubber is selected from the group consisting of natural rubber, polyisoprene rubber, polybutadiene rubber, and styrene-butadiene copolymer rubber.

TABLE 4

| | Comparative test 8 | Example 14 | Example 15 | Example 16 | Example 17 | Comparative test 9 | Example 18 | Comparative test 10 | Example 19 |
|---|---|---|---|---|---|---|---|---|---|
| Natural rubber | 100 | 100 | 100 | 100 | 100 | | | | |
| Synthetic polyisoprene rubber (Natsyn 2200) (made by Goodyear Tire, trademark) | | | | | | 100 | 100 | | |
| Polybutadiene rubber | | | | | | | | 100 | 100 |
| HAF carbon | 45 | 45 | 45 | 45 | 45 | 45 | 45 | 45 | 45 |
| Nocceler-MSA (made by Ouchi Shinko Kagaku Co., trademark) | 0.5 | 0.5 | 0.5 | 0.5 | 0.5 | 0.5 | 0.5 | 0.5 | 0.5 |
| Sulfur | 2.5 | 2.5 | 2.5 | 2.5 | 2.5 | 2.5 | 2.5 | 2.5 | 2.5 |
| 5-nitroso-8-hydroxyquinoline | | 1 | 2 | 4 | 8 | | 2 | | 2 |
| Heat ageing test (48 hours after ageing (100° C.)): | | | | | | | | | |
| Retention percentage of energy necessary for breakage of a sample after heat ageing compared to a sample prior to heat ageing (percent) | 57 | 63 | 64 | 66 | 67 | 61 | 66 | 26 | 39 |
| Variation ratio of 300% modulus (percent) | 117 | 106 | 108 | 113 | 115 | 124 | 122 | 124 | 115 |
| Dynamic ageing test (Test after ageing): Flex crack estimation | D | B | A | A | A | E | B | B | A |

NOTE.—Flex crack test=Bending time, 15,000.

Other than the compounding ingredients as shown in Table 4 the same additives described in Examples 1–10 were added and the test methods were followed to those in Examples 1–10.

From the results in Table 4, it is apparent that natural rubber, synthetic isoprene rubber and polybutadiene rubber can be improved in the heat ageing property and the dynamic ageing property by adding nitroso-quinoline compound and further that the heat ageing property and the dynamic ageing property can be improved by increasing the amount of nitroso-quinoline compound added.

What is claimed is:

1. A vulcanizable composition comprising a rubber having unsaturated double bonds in the molecule and

References Cited

UNITED STATES PATENTS

| | | | |
|---|---|---|---|
| 2,268,419 | 12/1941 | Paul | 260—800 |
| 2,746,963 | 5/1956 | Burckhalter | 260—286 |
| 2,861,975 | 11/1958 | Thompson | 260—45.8 |
| 3,337,493 | 8/1967 | New et al. | 260—45.8 |

OTHER REFERENCES

Helin et al., Chem. Abs., vol. 47, 1953, 2175 C.
Hollingshead, Chem. Abs., vol. 49, 1955, 10793 E.

DONALD E. CZAJA, Primary Examiner

R. A. WHITE, Assistant Examiner

U.S. Cl. X.R.

260—800